United States Patent [19]
Boakes

[11] Patent Number: 5,978,468
[45] Date of Patent: *Nov. 2, 1999

[54] SYSTEM AND METHOD FOR DISPLAYING NUMBERS ON A TELEPHONE WITH NO NUMERIC DISPLAY

[75] Inventor: Edward W. Boakes, Middletown, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/808,283

[22] Filed: Feb. 28, 1997

[51] Int. Cl.$^6$ ...................................................... H04M 1/00
[52] U.S. Cl. ........................... 379/354; 379/355; 379/396
[58] Field of Search ..................... 379/354, 355, 379/396, 142, 52; 395/180–185.1

[56] References Cited

U.S. PATENT DOCUMENTS

| | | |
|---|---|---|
| 3,715,520 | 2/1973 | Lambrou . |
| 4,743,897 | 5/1988 | Perez . |
| 5,146,490 | 9/1992 | Beckman ................................ 379/113 |
| 5,392,337 | 2/1995 | Baals et al. ................................. 379/96 |
| 5,506,895 | 4/1996 | Hirai et al. ................................ 379/142 |
| 5,703,936 | 12/1997 | Tsuchida et al. .......................... 379/88 |

*Primary Examiner*—N. Le
*Assistant Examiner*—Shih-Wen Hsieh
*Attorney, Agent, or Firm*—Gibbons, Del Deo, Dolan, Giffinger & Vecchione

[57] ABSTRACT

A telephone device and method that enable the user of the telephone to visibly read a number stored in a memory of the telephone even though the telephone does not have a numeric display. The telephone has at least one light, such as an LED, that is visible by a person using the telephone. The light is coupled to a controller that consists of a microprocessor and an LED driver. The microprocessor is coupled to the various keys on the telephone. When the microprocessor receives a command, via the telephone keys, for viewing a specific number, the microprocessor reads that number from memory. The microprocessor then instructs the driver to flash the light or lights on the telephone in such a manner that a person viewing the lights would become cognizant of the number. Thus, a person watching the telephones lights can read numbers from the memory of the telephone, even though the telephone does not have a numeric display.

20 Claims, 2 Drawing Sheets

SYSTEM AND METHOD FOR DISPLAYING NUMBERS ON A TELEPHONE WITH NO NUMERIC DISPLAY

BACKGROUND OF THE INVENTION

1. Field of the Invention

The present invention relates to telephone systems and related methods that display numeric sequences stored in the memory of the telephone.

2. Description of the Prior Art

Many telephones have liquid crystal displays (LCDs) that are used to either display a number dialed on that telephone or display a number that has been retrieved from the telephone's autodialing repertory. The display informs the user of the telephone about the number actually dialed or recalled from memory. As a result, the telephone user can check the accuracy of the number before the telephone call is completed. Furthermore, the telephone user can view numbers stored in the autodialing repertory of the telephone and can view other numbers stored in memory such as the number of the last call dialed.

Not all telephones, however, contain a numeric display. On such telephones, a user can not check the accuracy of a dialed number. Furthermore, a user has no means to either view a number stored in the telephone's autodialing repertory or view other numbers held in memory, such as the last number dialed.

A need therefore exists in the art for a system and method that enables a person to view a number stored in a telephone's memory on a telephone that does not have a numeric display.

SUMMARY OF THE INVENTION

The present invention is a telephone device and method that enable the user of the telephone to visibly read a number stored in a memory of the telephone even though that telephone does not have a numeric display. The telephone has at least one light, such as an LED or other light indicating device, that is visible by a person using the telephone. The light is coupled to a controller that consists of a digital processor, for example a microprocessor, and a light driver. The microprocessor is coupled to the various keys on the telephone. When the microprocessor receives a command, via the telephone keys, for viewing a specific number, the microprocessor reads that number from memory. The microprocessor then instructs the driver to flash the light or lights on the telephone in such a manner that a person viewing the lights would become cognizant of the number. Thus, a person watching the telephones lights can read numbers from the memory of the telephone, even though the telephone does not have a numeric display.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
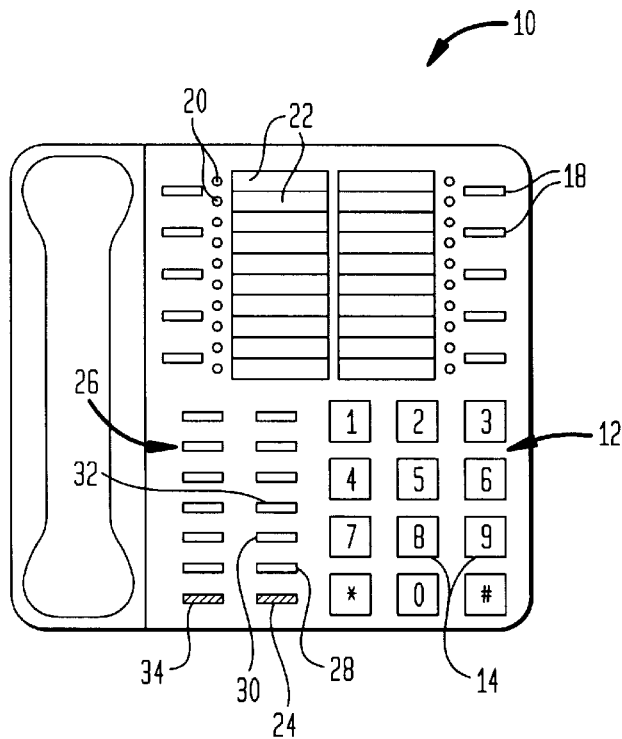
FIG. 1 shows a front view of a telephone that does not contain a numeric display and operates in accordance to the present invention.

Referring to FIG. 1, an exemplary telephone 10 is shown. The telephone 10 does not contain a numeric display. However, the telephone 10 does have an internal autodial repertory for storing commonly called numbers and an internal temporary redial memory for storing the number last dialed. Such telephones are exemplified by the model ISDN-10 telephone, manufactured by Lucent Technologies.

In the exemplary telephone 10 shown, a dialing keypad 12 is provided. The dialing keypad 12 contains keys 14 for the numbers zero through nine plus an asterisk (*) key and a pound (#) key, as is commonplace for most touch tone telephones. Above the dialing keypad 12 is a bank of memory access keys 18, wherein the memory access keys 18 are used to retrieve numbers from the autodial repertory memory of the telephone 10. In the shown exemplary embodiment, there are ten memory access keys 18 in the bank. The memory access keys 18 are arranged in two columns, each containing five keys. Adjacent to each of the memory access keys 18 are two light emitting diodes (LEDs) 20. Next to each of the LEDs 20 is a text space 22 into which a person can write a name or number that identifies one of the numbers held within the telephone's autodial repertory memory.

In the telephone system shown, each of the memory access keys 18 can be assigned to two different numbers in the autodial repertory memory. This is the reason each memory access key 18 is adjacent to two LEDs 20 and two text spaces 22. In normal operation, a person can retrieve a first number from the autodial repertory by simply pressing that memory access key 18. The LED 20 next to the number retrieved would then light to indicate to the user what number was being retrieved. If the user wanted to retrieve a second number assigned to one of the memory access keys 18, then that user would press a function key, such as a shift key 24, simultaneously with the memory access key 18. The telephone 10 would then retrieve the second number assigned to that memory access key 18 and the second lower LED 20 would light to indicate the number being retrieved. Telephones with two numbers assigned to each memory access key are well known and used in the prior art.

The shift key 24 along with the other function keys are located in a function key bank 26 on one side of the dialing key pad 12. The function keys include the traditional keys associated with a programmable telephone, such as a redial key 28, hold key 30, shift key 24, transfer key 32 and the like. In addition to such traditional keys, the function key bank 26 also includes a view key 34 or its equivalent. The view key 34 can be a dedicated key such as is shown. Alternatively, the equivalent of a dedicated view key can be a predetermined sequence of keys selected from the function key bank 26, the memory access key bank and/or the dialing keys 12.

The purpose of the view key 34 or its equivalent is to provide a means by which the telephone can visually indicate to a user the numbers it has stored in its autodial repertory memory and/or its temporary redial memory. To indicate to a user what number is being held in the autodial repertory memory or the temporary redial memory, the telephone 10 selectively flashes the LEDs 20 that are adjacent to each of the memory access keys 18 in a manner that will be explained.

Figure 2:
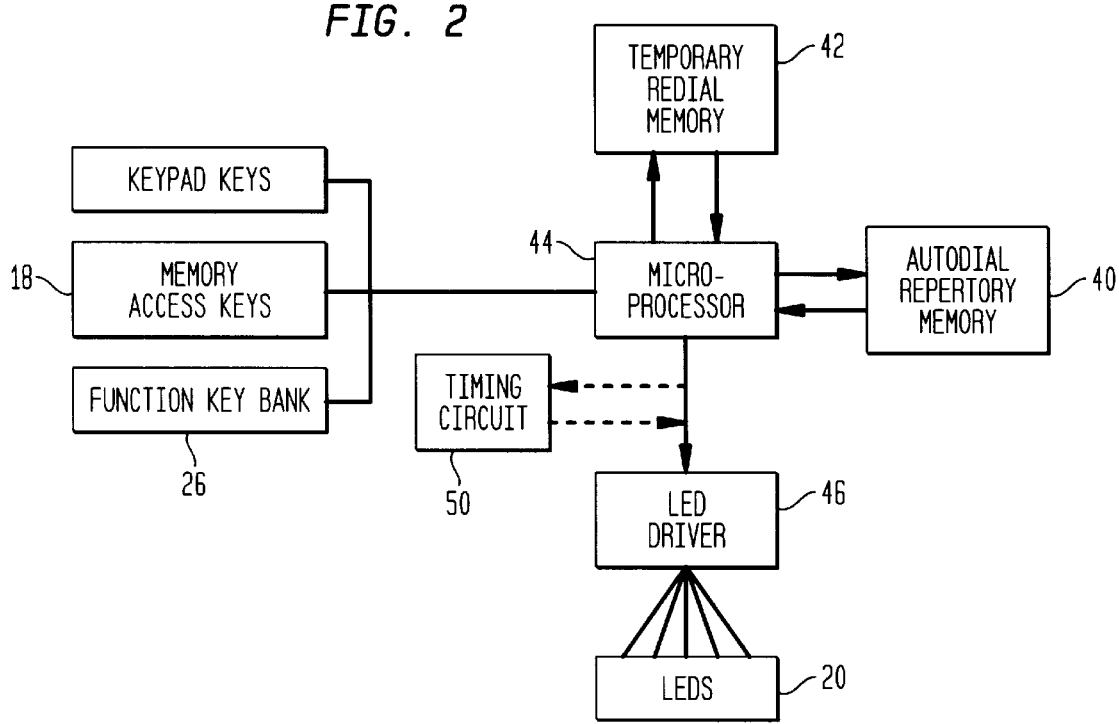
FIG. 2 is a block diagram schematic of an exemplary embodiment of the present invention display system as used in the telephone of FIG. 1.

Referring to FIG. 2, it can be seen that the telephone 10 (FIG. 1) includes an autodial repertory memory 40 and a temporary redial memory 42. The autodial repertory memory 40 stores telephone numbers that are assigned to the various memory access keys 18. The temporary redial memory 42 stores the key event sequence last dialed into the telephone. This allows a user to again dial that number sequence by simply pressing the redial key 28 (FIG. 1) in the function key bank 26.

If a user wanted to view what key sequence was currently being stored within the temporary redial memory 42, a user would press the view key 34 (FIG. 1) or its equivalents, followed by the redial key 28 (FIG. 1). Within the telephone is a microprocessor 44 that monitors the key events. Among other tasks, the microprocessor 44 controls an LED driver 46. The LED driver 46, in turn, controls the operation of the various LEDs 20 on the telephone. When the microprocessor 44 receives a key event sequence that includes an event from the view key 34 (FIG. 1) followed by a key event from the redial key 28 (FIG. 1), then the microprocessor 44 retrieves the number sequence stored in the temporary redial memory 42 and instructs the LED driver 46 to flash the LEDs 20 in a pattern that corresponds to the retrieved number sequence. As a result, a person viewing the LEDs 20 would become cognizant of the number last dialed on that telephone.

Figure 3:
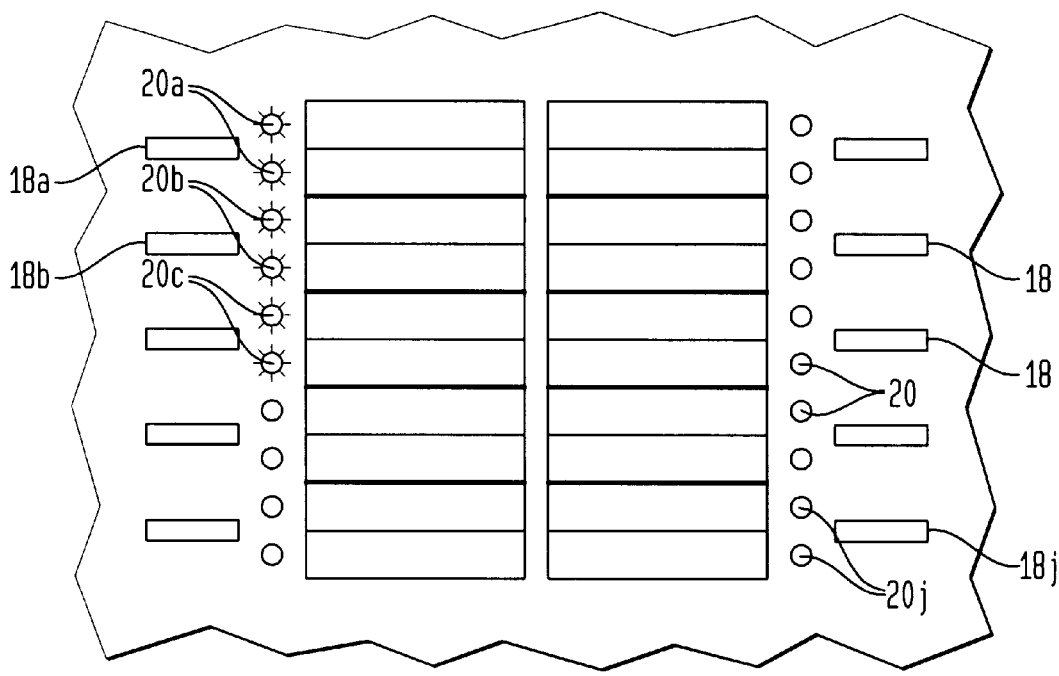
FIG. 3 is an enlarged view of the memory access keys contained upon the telephone of FIG. 1, wherein the keys contain LEDs lit in such a manner that they indicate the number three.
Figure 4:
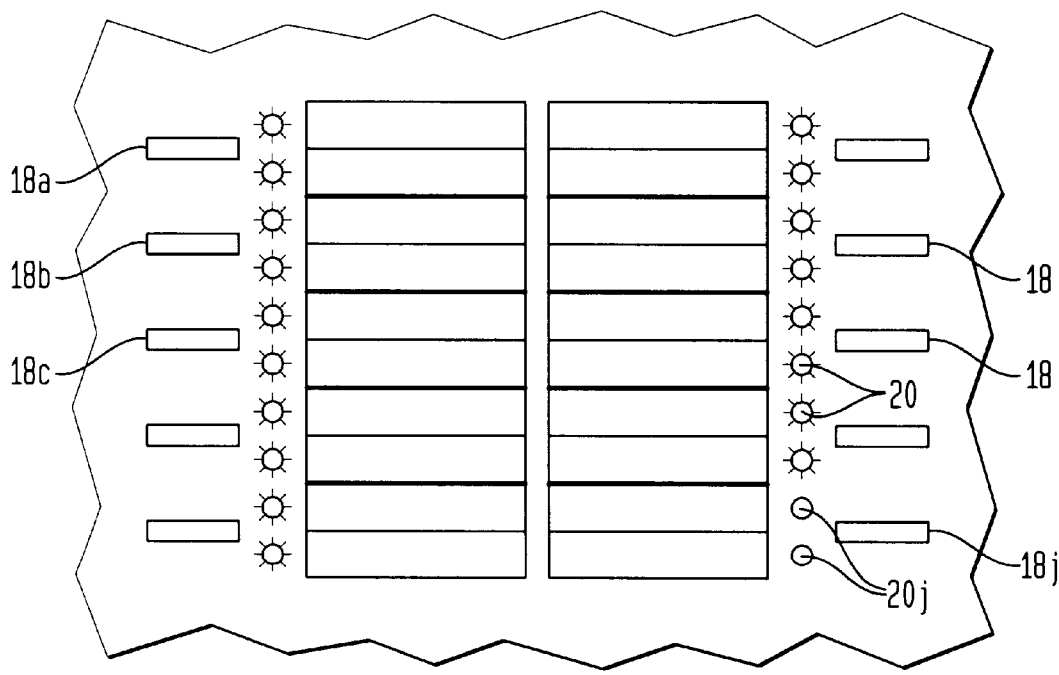
FIG. 4 is an enlarged view of the memory access keys contained upon the telephone of FIG. 1, wherein the keys contain LEDs lit in such a manner that they indicate the number nine.

Referring to FIG. 3, a preferred LED lighting sequence is shown that is intended to correspond to the number three. Referring to FIG. 4, a preferred LED lighting sequence is shown that is intended to correspond to the number nine. From FIG. 3 and FIG. 4, it can be seen that each pair of LEDs 20 adjacent each of the memory access keys 18 represents a corresponding number. The first pair of LEDs 20a next to the first memory access key 18a is assumed to be the number one. The second pair of LEDs 20b next to the second memory access key 18b is assumed to be the number two. Since there are ten pairs of LEDs 20 for ten memory access keys 18, the numbers one through nine can be simulated. The tenth pair of LEDs 20 next to the tenth memory access key 18 is used to simulated the number zero. The * and # keys and a pause may be indicated by unique patterns of illumination.

Since *, # and pause are also typically storable into the memory of a telephone, these may be indicated by unique illumination patterns other than those associated with the numbers 0 through 9. For the embodiment in FIG. 1, * could be indicated by flashing the LEDs associated with locations 1, 3, 5, 6, 8 and 10. The # could be indicated by flashing the LEDs associated with locations 2, 4, 7 and 9. A pause could be included by flashing the LEDs associated with locations 2, 3, 4, 7, 8 and 9. Other patterns, unique from those associated with the number 0 through 9 could alternatively be used, particularly when the number of LEDs or sets of LEDs differs from ten.

Consider the following example. If the number "123-4567" where stored in the temporary dial memory 42 (FIG. 2) of the telephone and a person desired to see an indication of that number, the person would press the view key 34 (FIG. 1), or its equivalents, followed by the redial key 28 (FIG. 1). Once this key sequence is received, the microprocessor 44 (FIG. 2) retrieves the number "123-4567" from the temporary redial memory 42 (FIG. 2) and directs the LED driver 46 (FIG. 2) to flash the LEDs 20. Referring to FIGS. 3 and 4, the number "1" would be simulated by flashing only the first pair of LEDs 20a adjacent the first memory access key 18a. A short pause of no lit LEDs 20 would then follow. The next number "2" would be simulated by flashing the first pair of LEDs 20a and the second pair of LEDs 20b, simultaneously. Another short pause of no lit LEDs 20 would then follow. The next number "3" would be simulated by flashing the first pair of LEDs 20a, the second pair of LEDs 20b and the third pair of LEDs 20c, simultaneously. This state is shown in FIG. 3. The flashing of the various LEDs 20 with intermittent pauses continues until the number "123-4567" is displayed one number at a time.

Referring back to FIG. 2, it can be seen that if a user wanted to view what telephone numbers that were currently being stored at the different addresses in the autodial repertory memory 40, a user would press the view key 34 (FIG. 1) or its equivalents, followed by the appropriate memory access key 18 or key sequence needed to access an address within the autodial repertory memory 40. When the microprocessor 44 within the telephone receives a key event sequence that includes an event from the view key 34 (FIG. 1) followed by a key event addressing the autodial repertory memory 40, then the microprocessor 44 retrieves the number sequence stored at that address within the autodial repertory memory 40 and instructs the LED driver 46 to flash the LEDs 20 in a pattern that corresponds to the retrieved number sequence. The LEDs 20 are flashed in the same manner as previously explained in regard to FIG. 3 and FIG. 4.

In the exemplary embodiment shown, their are ten sets of LEDs 20. As such, it is not difficult to flash the LEDs 20 in a manner that would simulate the numbers zero through nine. However, if less than ten LEDs are on a telephone or if only one LED were present, the present invention system and method can still be implemented. For fewer than ten LEDs, one or more of the LEDs can be sequentially flashed to indicate numbers. For example, if there were only one LED, that LED can be flashed once for the number one, twice for the number two, etc.

Additionally, in the shown embodiment, the LEDs 20 were located adjacent to each of the memory access keys 18. Such a location is merely exemplary and it should be understood that the LED can be located at any point on the telephone that would be visible by a person using that telephone.

In FIG. 2, it can be seen that an optional timing circuit 50 is coupled to the LED driver 46. The purpose of the timing circuit 50 is to vary the length of time that the various LEDs 20 flash when indicating a number. The timing circuit 50 is also coupled to the microprocessor 44, wherein the microprocessor 44 controls the timing circuit 50 in response to a user input entered via the function keys 26, displayed keys 12 and/or memory access keys 18.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. A telephone device, comprising:

at least one memory for storing at least one number sequence;

at least one LED visible on said telephone; and a controller for selectively flashing said at least one LED in a predetermined flashing sequence, wherein said predetermined flashing sequence provides a visual indication of said at least one number sequence, thereby enabling a person viewing said predetermined flashing sequence to directly determine said at least one number sequence.

2. The device according to claim 1, wherein said at least one memory includes a temporary redial memory and said at least one number sequence includes a number sequence last dialed on said telephone stored in said temporary redial memory.

3. The device according to claim 1, wherein said at least one memory includes an autodial repertory memory and said at least one number sequence includes a telephone number programmed into said autodial repertory memory.

4. The device according to claim 1, wherein said at least one light indicating device is configured to include at least ten LEDs wherein at least one of the LEDs represents a number between zero and nine when flashing.

5. The device according to claim 1, wherein said light indicating device is an LED, wherein said controller includes a microprocessor and an LED driver, wherein said driver is controlled by said microprocessor and flashes said at least one light indicating device in said predetermined flashing sequence at a given flash rate.

6. The device according to claim 5, further including a timing circuit for selectively altering said predetermined flash rate.

7. The device according to claim 1, further including a plurality of keys, wherein said controller flashes said at least one light indicating device in said predetermined flashing sequence when at least some of said keys are pressed in a predetermined sequence.

8. The device according to claim 1, further including address keys for addressing said at least one memory and a function key for activating said controller, wherein said controller flashes said at least one light indicating device said predetermined flashing sequence, and said predetermined flashing sequence provides a visual indication of a number at a predetermined address in said at least one memory that can be identified by pressing said function key and an address key.

9. In a telephone lacking an alpha-numeric display, a method of displaying a number sequence stored in the telephone's memory, comprising the steps of:

addressing a number sequence stored in the memory of the telephone; and flashing at least one light visible on said telephone in a predetermined sequence, wherein said predetermined sequence provides a visual indication of said number sequence that was addressed, thereby enabling a person viewing said predetermined flashing sequence to directly determine said at least one number sequence.

10. The method according to claim 9, wherein said telephone includes keys and said step of addressing a number sequence stored in the memory of the telephone includes pressing at least some of said keys in a predetermined key event sequence.

11. The method according to claim 10, wherein said keys are selected from a group consisting of keypad keys, function keys and memory access keys.

12. The method according to claim 9, wherein said at least one visible light is an LED.

13. The method according to claim 9, wherein said telephone contains at least ten visible lights and each of said lights represents a number between zero and nine when flashing in said predetermined sequence.

14. The method according to claim 10, wherein the telephone includes a temporary redial memory that stores a number sequence last dialed on the telephone.

15. The method according to claim 14, wherein the telephone includes a redial key and said step of addressing a number sequence includes pressing said redial key to address the number sequence last dialed stored in said temporary redial memory.

16. The method according to claim 15, wherein said telephone has function keys and said step of flashing said at least one light begins after at least one of said function keys is pressed, followed by the pressing of said redial key.

17. The method according to claim 10, wherein the telephone includes an autodial repertory memory that stores a plurality of programmed number sequences, and memory access keys used to address specific number sequences in said autodial repertory memory.

18. The method according to claim 17, wherein said step of addressing a number sequence includes pressing a memory access key to address a specific number sequence in said autodial repertory memory.

19. The method according to claim 18, wherein said telephone has function keys and said step of flashing said at least one light begins after at least one of said function keys is pressed, followed by the pressing of said memory access key.

20. The method according to claim 9, further including the step of selectively altering the speed at which said at least one light flashes in said predetermined sequence.

* * * * *